(12) United States Patent
Shively

(10) Patent No.: US 6,370,375 B1
(45) Date of Patent: *Apr. 9, 2002

(54) VOICE-RESPONSE PAGING DEVICE AND METHOD

(75) Inventor: Richard Robert Shively, Convent Station, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,174

(22) Filed: Apr. 14, 1997

(51) Int. Cl.[7] .............................................. H04M 11/10
(52) U.S. Cl. ...................................... 455/412; 340/7.22
(58) Field of Search ............................... 455/31.3, 32.3, 455/412; 379/83.3, 56.3, 68; 340/7.22, 7.23

(56) References Cited

U.S. PATENT DOCUMENTS

| | | | |
|---|---|---|---|
| 4,811,379 A | * | 3/1989 | Grandfield .................... 379/57 |
| 4,873,520 A | | 10/1989 | Fisch et al. |
| 4,885,577 A | | 12/1989 | Nelson |
| 4,891,637 A | | 1/1990 | Siwiak et al. |
| 4,910,510 A | | 3/1990 | Davis et al. |
| 5,022,024 A | | 6/1991 | Paneth et al. |
| 5,117,449 A | | 5/1992 | Metroka et al. |
| 5,117,460 A | | 5/1992 | Berry et al. |
| 5,381,138 A | | 1/1995 | Stair et al. |
| 5,412,719 A | | 5/1995 | Hamamoto et al. |
| 5,546,077 A | | 8/1996 | Lipp et al. |
| 5,574,771 A | * | 11/1996 | Driessen et al. ............ 455/31.3 |
| 5,815,800 A | * | 9/1998 | Su et al. ..................... 455/31.3 |
| 6,002,719 A | * | 12/1999 | Parvulescu et al. ......... 375/240 |
| 6,038,290 A | * | 3/2000 | Katada ....................... 455/31.3 |

FOREIGN PATENT DOCUMENTS

| | | |
|---|---|---|
| CA | 2152695 | 2/1996 |
| EP | 642 286 | 3/1995 |
| EP | 748 138 | 12/1996 |
| EP | 762 711 | 3/1997 |

OTHER PUBLICATIONS

"A New Air–Interface Protocol for Mobile Packet Data", J.L. Haine, IEE Colloquium on Future Mobile Radio Trucking and Data Systems, Feb. 17, 1991, London, pp. 4/1–4/10.
CIPO, Correspondence from Canadian Intellectual Property Office, dated Dec. 29, 2000, Voice–Response Paging Device and Method, pp. 1–3.
CIPO, Correspondence from Canadian inteleectual Property Office, dated Oct. 19, 1999, "Voice–Response Paging Device and Method", pp. 1–4.

* cited by examiner

Primary Examiner—Daniel Hunter
Assistant Examiner—Nick Corsaro

(57) ABSTRACT

The present invention solves the current problem of allowing ad-hoc (manual) voice response by a user to a page received by a paging device. In one aspect of the invention, a paging device includes a digital signal processor for receiving and compressing a voice response to a page prior to transmission back to the paging party. In further aspects of the invention, the speech is first recorded and compressed and then transmitted to a wireless base station for subsequent transmission to the calling party.

13 Claims, 4 Drawing Sheets

VOICE-RESPONSE PAGING DEVICE AND METHOD

BACKGROUND OF THE INVENTION

The present invention relates generally to paging systems and, in particular, to a voice-response two-way paging device.

In conventional paging systems, a paging device receives messages from a paging network RF transmitter. The paging device may also allow the paged party to acknowledge receipt of the page. For example, some two way pagers provide a mechanism for responding to a page by sending a code back to the network which activates a preprogrammed voice message. See, for example, U.S. Pat. No. 4,965,569. Although these systems are inexpensive, the voice message is limited to canned responses. An alternative acknowledgment system allows a voice response to be transmitted in real-time (either immediately or after a delay interval) to the calling party. See, for example, U.S. Pat. No. 4,811,379. However, these systems have seen limited commercial implementation because of problems with size, cost, bandwidth requirements, limited flexibility, and power consumption. Consequently, the market for two-way paging systems has been limited. Accordingly, there is a need to provide an ad-hoc voice response capability to a paging device while still maintaining the low-power, small size, and low cost characteristics of a conventional paging device.

SUMMARY OF THE INVENTION

Aspects of the present invention enable voice response to a page while maintaining the favorable characteristics of paging devices, i.e., low cost, small size, extended battery life, and simplicity of use.

In one aspect of the invention, a paging device includes a digital signal processor for compressing voice prior to transmission to the paging party. Using this aspect of the invention, a paging service provider can deliver a valuable new service to subscribers without having to adversely raise service prices or increase the size or cost of the pager.

In another aspect of the invention, the paging device receives, digitizes, compresses, and stores a response input by a user through, for example, activation of a push-to-talk button. The pager may thereafter transmit the response back to the calling party. In still other aspects of the invention, the digitizing and compression of the speech does not occur at the same time as the transmission of the speech. In this manner, it is possible to substantially reduce the peak power requirements of the paging device. Accordingly, the paging device only requires enough power to operate either the compression circuitry or the transmission circuitry, but not both. In other aspects of the invention, the amount of power required by the pager can be reduced by transmitting the voice at less than a real time.

In further aspects of the invention, the paging device can respond to E-mail originated pages via an E-mail packaged audio file transmitted back to the sender as a reply message. In still other aspect of the present invention, an improved user interface simplifies the recording and sending of ad-hoc responses. In one aspect, the pager includes a push-to-talk switch located on the side of the pager. In still other aspects of the invention, the push-to-talk switch includes an integrated record, play, review and/or stop switch. In still other aspects of the invention, the pager includes a mode key, a select key, one or more cursor keys, and/or telephone keypad. In still further aspects of the invention, the user interface includes a number of advantageously placed controls integrated into the paging device to facilitate response paging.

Alternate aspects of the invention include one or more of the devices, elements, and/or steps described herein in any combination or subcombination. It should be clear that the claims may recite or be amended to recite any of these combinations or subcombinations as an invention without limitation to the examples in the specification.

DETAILED DESCRIPTION OF THE PREFERRED EMBODIMENTS

Figure 1:
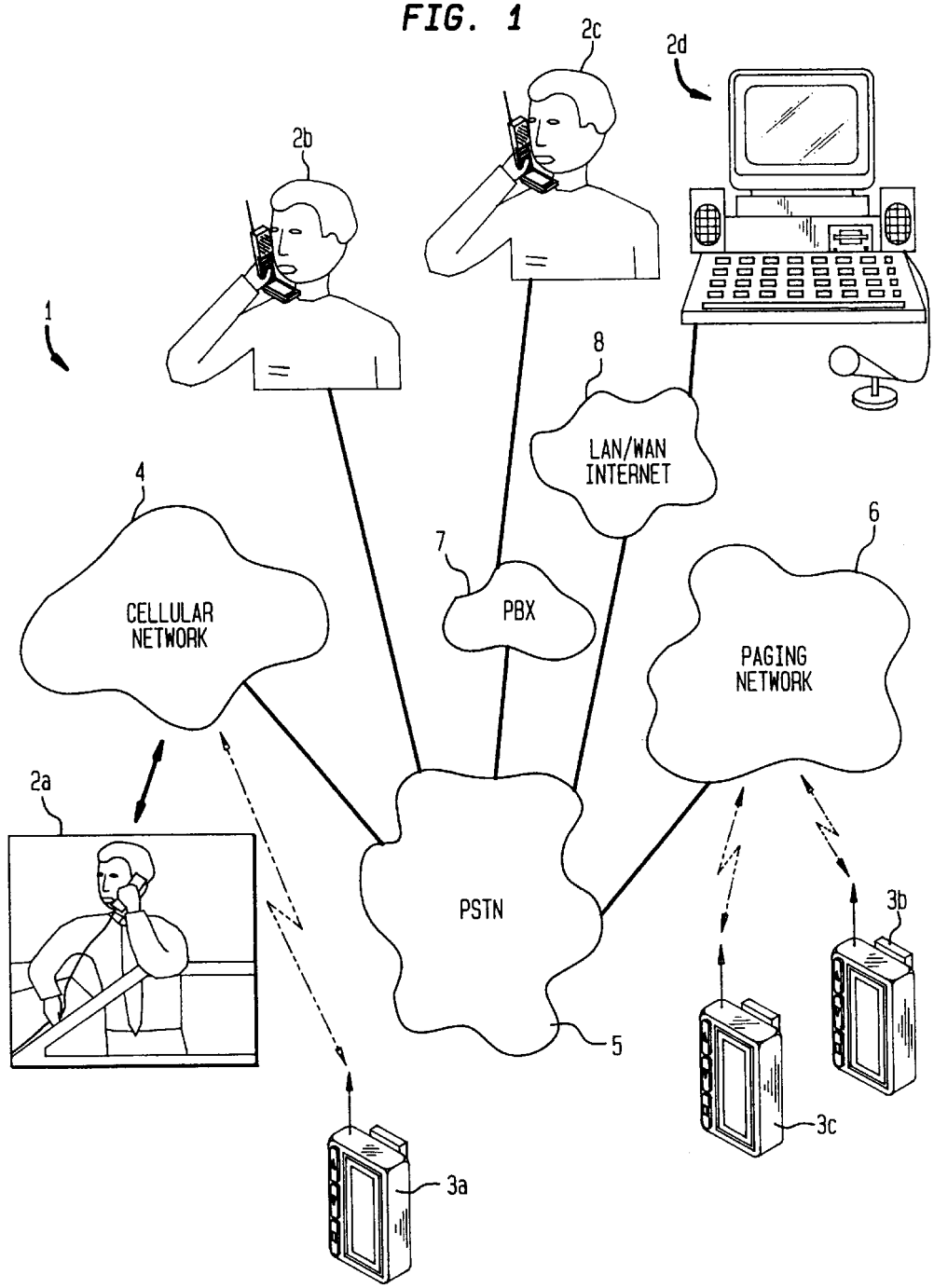
FIG. 1 shows a illustrative embodiment of a communication system incorporating aspects of the present invention.

FIG. 1 shows an illustrative embodiment of a communications network 1 incorporating the present invention. A calling party may attempt to page a paging device user across the communications network 1. In exemplary embodiments, the communications network 1 may comprise a number of interconnected sub-networks such as a cellular network 4, a public switched telephone network (PSTN) 5, a private branch exchange 7, a network connection 8 (e.g., local area network (LAN), wide area network (WAN), and/or Internet connection), a paging network 6, and/or another conventional is network arrangement. The connection of the calling party to the network may be variously configured. For example, first, second, third, fourth, and fifth calling parties/devices 2a, 2b, 2c, 2d, and 3c may be respectively connected to the paging communications network 1 via the cellular network 4, the PSTN 5, the PBX 7, the network connection 8, and/or the paging network 6. Each of the calling parties may be respectively assigned a calling party number and/or other network identification address such as an IP address. The calling parties may communicate with each other and/or any of a plurality of paging devices 3a, 3b, 3c.

The term "paging network" is a generic term which may be used to define the communications network operating to page any the paging devices 3a, 3b, 3c. As shown in FIG. 1, the paging network may indeed have separate facilities from other wireless communications networks or may use the cellular communications network as the means to page the paging devices. For example, communications with the paging devices may occur utilizing the cellular base station setup channel as the radio frequency (RF) transmitter for sending the page to the paging device. Further, where a conventional wireless cellular base station is utilized, it may be desirable to utilize spare control channel capacity to accommodate the modest communications load resulting from implementations of embodiments of the invention as described herein. The use of spare control channel capacity allows the implementation of a valuable new service with little or no additional infrastructure. The use of the paging network allows packetized communications tolerant of some system latency and therefore provides a platform for implementing a low cost and low power two-way paging device in accordance with aspects of the present invention.

Figure 2:
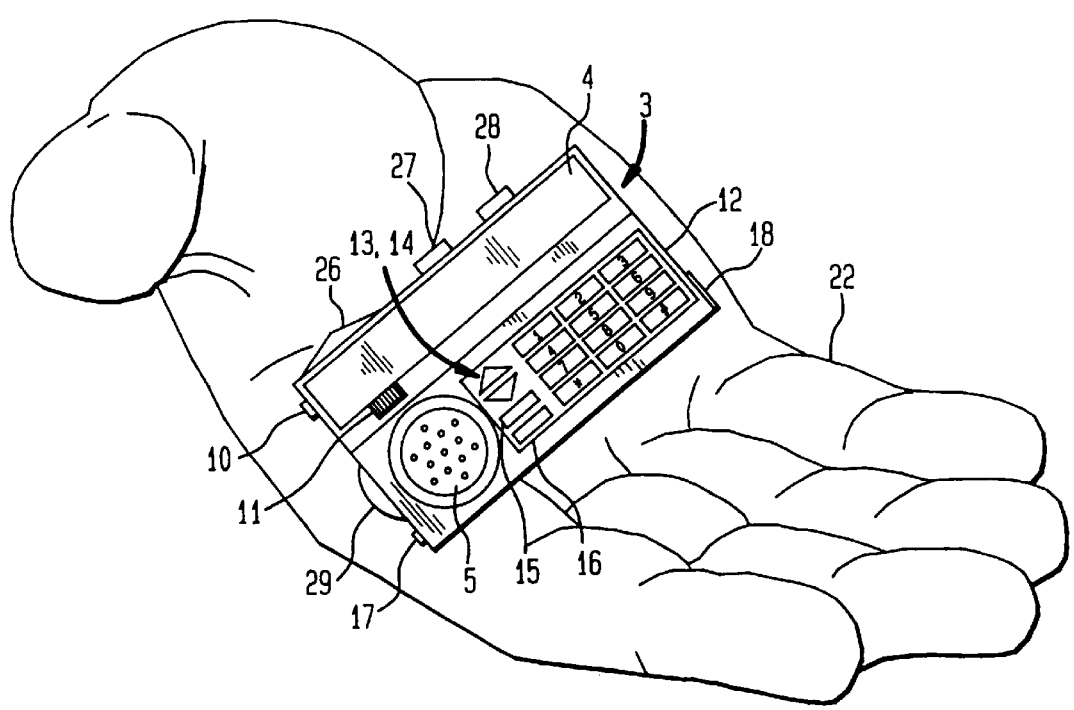
FIG. 2 shows one example of a pager for use in the communications system which incorporates aspects of the present invention.

Referring to FIG. 2, a prospective view of a first exemplary embodiment of a paging device 3 including one or more user interface mechanisms is shown. In the illustrated embodiment, the paging device 3 includes a display 24, a speaker 25, a push to talk switch 26 (which may be an integrated record, play, rewind, and stop slide switch as conventionally utilized on executive dictation devices), a fast forward control 27, review-play incoming message/send response control 28, a volume control 29, a microphone 10, a low battery indicator 11, a telephone keypad 12, up and down cursor keys 13, 14, a mode key 15, and a select key 16, an on-off switch 17, and a communications port such as an infrared data port 18. It should be noted that a speaker 25 is not essential. In some applications where conservation of power is paramount, a speaker 25 may not be utilized.

Figure 3:
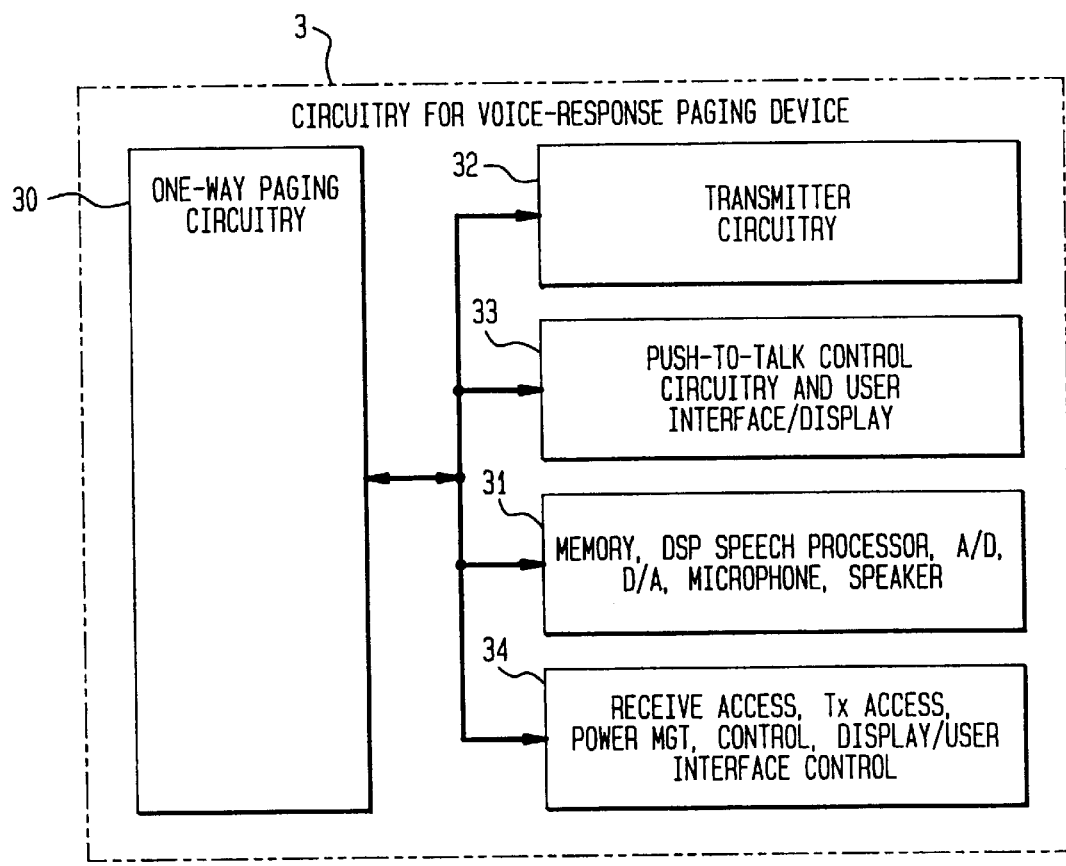
FIG. 3 shows a block diagram of one embodiment of an architecture suitable for use in the paging device.

FIG. 3 shows an exemplary architecture for implementing the paging device 3 in accordance with aspects of the present invention. The embodiment shown in FIG. 3 may include conventional one-way paging circuitry 30 for receiving pages, RF transmitter circuitry 32 for transmitting ad-hoc responses, speech processing circuitry 31 for processing speech, user interface circuitry 33 for interfacing with the user, and control circuitry 34 for controlling circuits in the paging device 3.

The speech processing circuitry 31 may be variously configured to include a microphone, a speaker, a D/A converter, an A/D converter, a memory device (e.g., RAM, Flash RAM), and/or a digital signal processor (DSP). The speech processing circuitry 31 may be configured to input speech via the microphone, digitize the speech, compress the speech using the digital signal processor, store the speech, and output the speech to the transmitter circuitry. The speech processing circuitry 31 may also be configured to convert the digitized speech back into analog form prior to playback or transmission to another device. The compression algorithm used by the speech processing circuitry may be variously configured as is well know in the art and may utilize a form of linear predictive coding (LPC) to compress the speech for storage and/or transmission. The speech may be compressed in real time, or may be compressed over an extended non-real time interval. The compressed speech may be decompressed and played back so that the user can monitor and/or edit the message previously recorded.

The user interface circuitry 33 may be variously configured to include the display 24, the push-to-talk switch 26 including optional controls for a combined record, play, rewind, and stop slide switch, the fast forward control 27, the review-play incoming message/send response control 28, the volume control 29, the microphone 10, the low battery indicator 11, the telephone keypad 12, the up and down cursor keys 13, 14, the mode key 15, the select key 16, the on-off switch 17, the communications port 18 and/or is other user interface circuitry. Control for the user interface circuitry is provided by control circuitry 34. Control circuitry 34 may be an integrated microcontroller or other apparatus suitable for providing control for the circuits in the paging device 3. The control circuitry may also include power management control for selectively placing one or more of the circuits in the paging device 3 from an active mode into a sleep, standby, or idle mode to conserve power. For example, the power management control may operate to enable either the transmit circuitry or speech compression in the speech processing circuitry 31 so that these circuits are not powered at the same time. The transmitter circuitry 32 may utilize the same circuitry utilized today for two-way acknowledgment paging devices or may include other suitable transmitter circuitry.

Operational details and construction of the circuits utilized in conventional two-way acknowledgment paging devices, wireless base stations, digital dictation devices, and cellular connected computers are known to those skilled in the art. For simplicity, the conventional circuits utilized in these devices which are also included in the forgoing examples not described in great detail in the present application. The novelty of the present invention lies in the new combination and use of these circuits in a voice response paging device to deliver valuable new serviced to subscribers while maintaining the relatively lowcost and small size of the conventional paging device.

The paging device 3 may be have a relatively small form factor such that it is about "palm sized" and/or small enough to fit in a shirt pocket of a user. In the illustrated embodiment, the paging device 3 is shown being held in the palm 22 of a user. The small size of this device is made possible by a number of technical advances in the operation of the circuits in the paging device as disclosed herein.

In operation, the paging device 3 may receive audio and/or digital pages as any other conventional paging device. The present device also allows the user to acknowledge the page and transmit a short message without the need to search for a telephone or to include an unacceptably large alphanumeric keypad. Further, it is possible to provide an adhoc voice response while maintaining the low power and low cost structure associated with paging devices. The lower costs associated with paging devices is in large part due to the low power consumption and messaging nature of the paging devices.

The present device allows a user to record an ad hoc message by, for example, moving switch 26 into a record mode and speaking into the microphone 10. The speech may then be converted into digital format by using an analog/digital (A/D) converter, compressed using a signal processor and a suitable voice compression algorithm, and stored in a memory for later playback or transmission. In exemplary embodiments, the paging device may utilize a low power integrated digital signal processor, A/D converter, and/or memory. The digital signal processor may include a low power idle mode and an active mode. If the particular embodiment of the paging device is equipped with a speaker, the user can optionally review, edit, and/or re-record the message prior to transmission. For example, by moving the switch 26 into the rewind position and then to the play position, voice messages may be reviewed prior to transmission. The rewind position simply backs up in the memory the present audio message to be sent. If necessary, the user can modify the message by recording over all or a portion of the message. When satisfied with the content of the message the user can store the message using mode key 15, cursor controls 13, 14, and associated display commands; forward to message to any one of a number of stored phone numbers entered via keypad 12 or port 18 (including a broadcast option); or reply to a previously received page by entering one or more commands, e.g., by again depressing the play/response button 24 after reviewing an incoming voice or data message.

In some embodiments, the user interface of the paging device 3 optionally includes the up cursor control button 13, the down cursor control button 14, mode key 15 and select key 16 and/or display 24. In these embodiments, it is possible to enable a large number of functions and modes with a minimum number of user control buttons. Although an alphanumeric keypad may provide more flexibility, the large size of the key pad makes its incorporation into the relatively small form factor of the pager impractical absent a sophisticated clam-shell fold-out keyboard design. If a fold-out clam-shell keyboard is utilized, the keyboard preferably has keys on both the pager side and the folded-out portion. The utilization of a voice response increases the usability and flexibility of the pager without the added cost of an expensive keyboard. In some embodiments, no keyboard at all is necessary. The pager may be operated under voice control using a simple a push to talk switch. Alternatively, the use of the scroll, mode, and select key vastly increases the functionality of the user interface by enabling the user to enter any one of a number of different modes with only a limited number of keys in the user interface. In this manner, the user may initiate calls and electronic mail, return calls and electronic mail, as well as review and revise stored data such as stored phone numbers using only a subset of keys.

A major feature of one embodiment of the pager is the incorporation of a voice compression processor (e.g., digital signal processor) in the pager and a second voice decompression processor in the paging network (e.g., in a wireless base station). For example, the voice may be compressed on the order of about 2.5 kilobits per second. In this manner, the transmission rate between the pager and the paging network can be at a much slower speed, e.g., 100, 200, 300, 400, or 500 bits per second. By slowing the rate of transmission between the paging devices 3a, 3b, 3c and the paging network 4 power can be conserved while still allowing for ad-hoc voice response messages. By providing a return link from the paging device (typically in the form of a messaging service rather than a variant of a cell phone service) at a slower speed, the advantageous cost and size of the pager may be maintained.

Further, the output data may be packetized so that it can be sent in widely varying time frames and re-assembled by a signal processor associated with the paging network for transmission back to the calling party. For even better throughput, the response back to the calling party may utilize a cell-relay or a frame-relay type packet configuration to minimize the amount of overhead associated with the particular packet.

Figure 4:
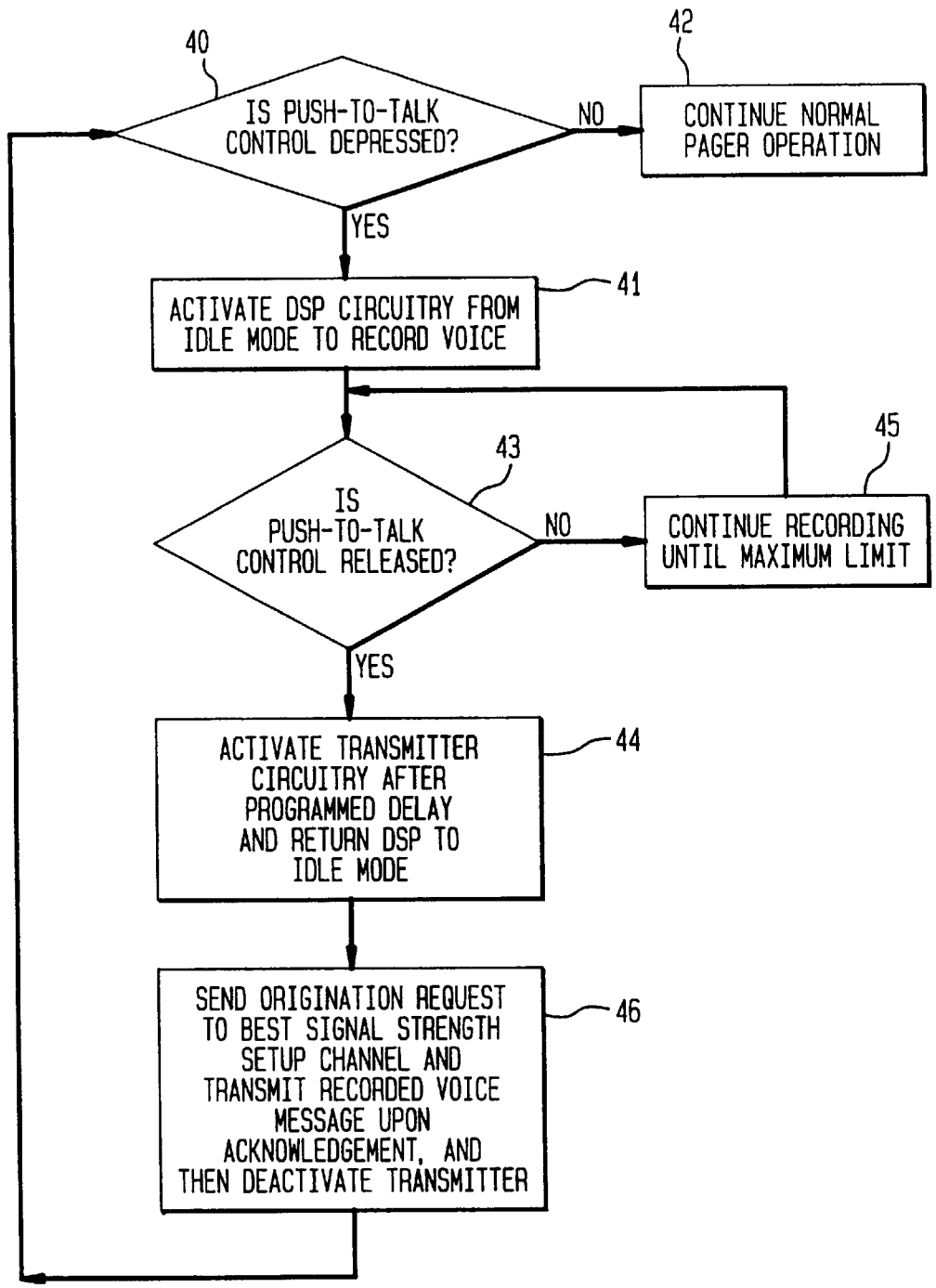
FIG. 4 shows a flowchart process diagram describing one aspect of the operation of the paging device shown in FIG. 2.

The present voice response paging device enables a number of useful applications of the communications network 2. For example, in a first exemplary embodiment of the operation of the communications network 2 will be described with reference to FIG. 4. FIG. 4 shows a flowchart process diagram for operating the present invention. The paging device will continue to operate normally (receiving pages) until the user interface (e.g., push-to-talk button 26) is activated (step 40) by the paging device user, normally in response to a received page and/or a desire to communicate with a originating/calling party number (e.g., a number sent to the paging device). Upon user interface depression, the digital signal processor is activated (step 41) and records voice signals received from the user, via the microphone, and stores the voice digitally using a pre-programmed digital signal processor algorithm. Recording continues until the user releases the push-to-talk button 26 (step 43, 45). To ensure low power operation of the paging device, a maximum limit of record time can be pre-programmed into the digital signal processor (e.g., 5 seconds). After completion of voice recording, the digital signal processor may return to an idle mode that requires less power than is required during actual voice recording. Following completion of voice recording (user interface released by user) and preferably a pre-programmed delay (less than real-time response) to further ensure low power consumption, the RF transmitter is activated (step 44) to transmit the recorded voice message to a wireless base station in the paging network, which may be the base station with the highest received signal strength from the setup channel (step 46). To ensure optimum connectivity with the calling party number, the paging device, following conventional cellular phone setup procedures, may send an origination request to the setup channel and the setup channel may respond with an acknowledgment signal indicating that a voice connection path to the voice communications system of the originating calling party number (or another number) is available. Following reception of the acknowledgment signal, the RF transmitter, using conventional radio processing techniques, will send the recorded voice message signal on the setup channel for subsequent transmission to the calling party number (or another number) upon voice connection being established to the calling party number. As can be seen, the present invention provides voice response capability to the paging device user without sacrificing low power consumption. This ensures familiar voice message service delivery to the paging device user with the addition of voice message feedback service to the originating calling party number.

In alternate embodiments, the voice response system may be utilized in any number of applications. For example, parents may utilize the voice response system to keep track of children. Upon receiving a page, a child may inform a parent of his/her whereabouts and expected time of return. Further, the child may request that their parent come and pick them up from a party, sporting event, or other activity. The device may also be utilized by businesses to communicate with their repair personnel who may be out in the field. In this manner, the repair personnel do not have to stop to locate a telephone or use/carry a radio. The repair personnel can simply respond using the paging device.

In yet other embodiments, the voice paging device may be issued by an automobile association and all of its members. The paging device may be very inexpensive and therefore be distributed at a minimal cost. Each of the automobile club users may keep the paging device in the glove box of their cars. The paging device could be pre-programmed to call a centralized location to report the need for roadside assistance, and to reply to the vehicle the approximate time that help will arrive. In this manner, the person in the car could verbally indicate his/her location and would not need to leave the vehicle to signal for help, vastly increasing the safety of the vehicle occupant. Additionally, the paging device could be pre-installed in the car as optional equipment.

In yet other embodiments of the invention, a user could use the paging device to retrieve and send E-mail. The retrieved E-mail would be displayed on the display on the paging device. Reply E-mail would be voice recorded as a digital file, e.g., as an XXX.WAV file which can be processed by most modem E-mail systems. In this manner, the user can reply to received E-mail while away from a terminal. To read the E-mail, the user simply clicks on an icon representing the XXX.WAV file. Similarly, links may be provided to a user's voice mail so that voice mail may be checked and replied to without the use of a telephone. In these and other embodiments, it may be useful to utilize an IRD port to load predefined phone numbers, messages, names, addresses, reminders, calendars, etc., into the paging device for use as a portable information manager.

In still further examples, by entering numbers and/or E-mail addresses into the device as either pre-programmed numbers via the infrared port and/or via the keypad, it is possible to initiate calls so that a user can send a voice and/or E-mail message to his or her spouse to advise them of any impeding event, e.g., company for dinner or a delay in coming home for dinner. In yet another example, the paging device may be used either alone or in conjunction with an E-mail based calendar system to alert the user to a scheduled event. For example, the user may have a scheduled event alarm set for 4:00 p.m. on a certain day entered into his calendar on his computer or directly into his pager via the user interface (e.g., the IRD port). If the calendar program is utilized, when the alarm is indicated, the calendar program may initiate an E-mail to the pager alerting the user to the scheduled event and containing a message describing the calendar entry.

Further, the user may use the pager as a personal digital messaging pad for storing personal E-mail notes (e.g., things to do) on his workstation back at the office. For example, while driving home the user may think of a task that needs to be done the next day. The user may use the paging device to send him/herself a digital voice recorded E-mail to remind him/her of the task to be done.

Additionally, in still further embodiments the user or a system administrator may download updated phone numbers, E-mail addresses, and/or operating code directly to the paging device via a command code sequence over the network. In this manner, all paging devices may be reprogrammed to accommodate new features, services, and/or modified communication parameters such as addresses (e.g., phone numbers, E-mail addresses). The reprogramming may be stored in a non-volatile memory device such as flash RAM in the speech processing circuitry 31 or the control circuitry 34.

Although the present invention is described using a push-to-talk button interface, other embodiments may use a different interface such as a touch screen or voice activated interface. For example, each of the aforementioned user interface functions may be accomplished via a touch screen or via voice recognition command sequences whose implementation is well-known in the art. Accordingly, it is intended that the appended claims cover all such modifications.

What is claimed is:

1. A pager for use in a paging communication system comprising:
   a microphone for converting received voice signals into electrical signals;
   a digital signal processor, coupled to the microphone, configured for receiving, compressing, and storing the electrical signals as compressed voice signals;
   a switch coupled to the digital signal processor for selectively activating the digital signal processor; and
   a radio frequency (RF) transmitter coupled to the digital signal processor for transmitting the compressed voice signals to a wireless base station within a paging network, wherein the compressed voice signals are transmitted between the pager and the paging network at a speed that is slower than transmission speed for non-compressed voice signals.

2. The pager of claim 1 wherein the digital signal processor includes an idle mode and a active mode, the digital signal processor being configured to normally operate in the idle mode and then to operate in the active mode during the receiving, compressing, or storing of the electrical signals.

3. A pager for use in a paging communications system comprising:
   a microphone for converting received voice signals into electrical signals;
   a digital signal processor, coupled to the microphone, configured for receiving, compressing, and storing the electrical signals as compressed voice signals;
   a switch coupled to the digital signal processor for selectively activating the digital signal processor; and
   a radio frequency (RF) transmitter coupled to the digital signal processor for transmitting the compressed voice signals to a wireless base station within a paging network;
   wherein the compressed voice signals are packetized prior to transmission.

4. The pager of claim 1 wherein the compressed voice is transmitted at a time other than a time period in which the electrical signals are being compressed by the digital signal processor.

5. A pager for use in a paging communications system comprising:
   a microphone for converting received voice signals into electrical signals;
   a digital signal processor, coupled to the microphone, configured for receiving, compressing, and storing the electrical signals as compressed voice signals,
   a switch coupled to the digital signal processor for selectively activating the digital signal processor, and
   a radio frequency (RF) transmitter coupled to the digital signal processor for transmitting the compressed voice signals to a wireless base station within a paging network:
      wherein the switch is an integrated record, play, rewind, and stop switch.

6. The pager of claim 1 including a telephone keypad and excluding real time voice communication capabilities.

7. The pager of claim 1 including an infrared port.

8. A pager for use in a paging communications system comprising:
   a microphone for converting received voice signals into electrical signals;
   a digital signal processor, coupled to the microphone, configured for receiving, compressing, and storing the electrical signals as compressed voice signals:
   a switch coupled to the digital signal processor for selectively activating the digital signal processor, and
   a radio frequency (RF) transmitter coupled to the digital signal processor for transmitting the compressed voice signals to a wireless base station within a paging network:
   the pager further including an infrared port:
      wherein the infrared port includes circuitry for outputting voice messages as digital signals.

9. The pager of claim 7 wherein the infrared port includes circuitry for inputting addresses.

10. The pager of claim 9 wherein the addresses include phone numbers.

11. A pager for use in a paging communications system comprising:
   a microphone for converting received voice signals into electrical signals;
   a digital signal processor, coupled to the microphone, configured for receiving, compressing, and storing the electrical signals as compressed voice signals;
   a switch coupled to the digital signal processor for selectively activating the digital signal processor, and
   a radio frequency (RF) transmitter coupled to the digital signal processor for transmitting the compressed voice signals to a wireless base station within a paging network;
      the pager further including an infrared port, wherein the infrared port includes circuitry for inputting addresses, and wherein the addresses include electronic mail addresses.

12. The pager of claim 1 including a display, a mode key and a select key for selecting an operating mode.

13. The pager of claim 1 including a display, a cursor up key and a cursor down key for scrolling through received messages.

* * * * *